US008779048B2

(12) United States Patent
Federzoni et al.

(10) Patent No.: US 8,779,048 B2
(45) Date of Patent: Jul. 15, 2014

(54) METHOD FOR PRODUCING CERAMIC OR METAL COMPONENTS BY MEANS OF POWDER INJECTION MOULDING, BASED ON THE USE OF INORGANIC FIBRES OR NANOFIBRES

(71) Applicant: Commissariat A L'Energie Atomique et aux Energies Alternatives, Paris (FR)

(72) Inventors: Luc Federzoni, Bourgoin-Jallieu (FR); Pascal Revirand, Saint Egreve (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 0 days.

(21) Appl. No.: 14/031,445

(22) Filed: Sep. 19, 2013

(65) Prior Publication Data

US 2014/0018483 A1    Jan. 16, 2014

Related U.S. Application Data

(63) Continuation of application No. PCT/FR2012/050464, filed on Mar. 7, 2012.

(30) Foreign Application Priority Data

Apr. 13, 2011    (FR) ...................... 11 53208

(51) Int. Cl.
*C08K 3/22*    (2006.01)
(52) U.S. Cl.
USPC ........................... 524/430; 524/437; 524/439
(58) Field of Classification Search
USPC .......................................... 524/430, 437, 439
See application file for complete search history.

(56) References Cited

U.S. PATENT DOCUMENTS

| | | | |
|---|---|---|---|
| 6,573,322 B1 * | 6/2003 | Sakakibara et al. .......... | 524/434 |
| 2008/0232996 A1 | 9/2008 | Federzoni et al. | |
| 2009/0105388 A1 * | 4/2009 | Tanaka et al. .................. | 524/430 |
| 2009/0115092 A1 | 5/2009 | Federzoni et al. | |

FOREIGN PATENT DOCUMENTS

| | | |
|---|---|---|
| EP | 1 972 419 A1 | 9/2008 |
| JP | 57-065754 * | 4/1982 |
| WO | 2008/003877 A1 | 1/2008 |

OTHER PUBLICATIONS

Eric Nyberg, et al., "Microstructure and Mechanical Properties of Titanium Components Fabricated by a New Powder Injection Molding Technique," Materials Science and Engineering C, Elsevier Science S.A., CH, vol. 25, No. 3, May 1, 2005, pp. 336-342.
Hezhou Ye, et al., "Fabrication of Metal Matrix Composites by Metal Injection Molding—A Review," Journal of Materials Processing Technology, vol. 200, No. 1-3, Nov. 6, 2007, pp. 12-24.
C. Karatas, et al., "Rheological Properties of Feedstocks Prepared with Steatite Powder and Polyethylene-Based Thermoplastic Binders," Journal of Materials Processing Technology, vol. 152, No. 1, Oct. 1, 2004, pp. 77-83.
R. Ruprecht et al., "Injection Molding of Microstructured Components from Plastics, Metals and Ceramics," Microsystem Technologies, vol. 8, No. 4-5, Aug. 1, 2002, pp. 351-358.
L. Merz, et al., "Feedstock Development for Micro Powder Injection Molding," Microsystem Technologies, vol. 8, No. 2-3, May 1, 2002, pp. 129-132.
Volker Piotter, et al, "Micro Powder-Injection Moulding of Metals and Ceramics," Sadhana, Indian Academy of Sciences, Bangalore, IN, vol. 28, No. Part 01/02, Feb. 1, 2003, pp. 299-306.
International Search Report dated Apr. 27, 2012.

* cited by examiner

*Primary Examiner* — Peter Szekely
(74) *Attorney, Agent, or Firm* — Burr & Brown, PLLC

(57) ABSTRACT

The invention first relates to a feedstock for PIM, including a metal or ceramic powder; a polymeric binder; metallic or ceramic fibers or nanofibers, the fibers or nanofibers being metallic when the powder is metallic, and the fibers or nanofibers being ceramic when the powder is ceramic. It also relates to the method for producing such a feedstock, as well as the method for producing parts by means of powder injection molding (PIM) using said feedstock.

20 Claims, 1 Drawing Sheet

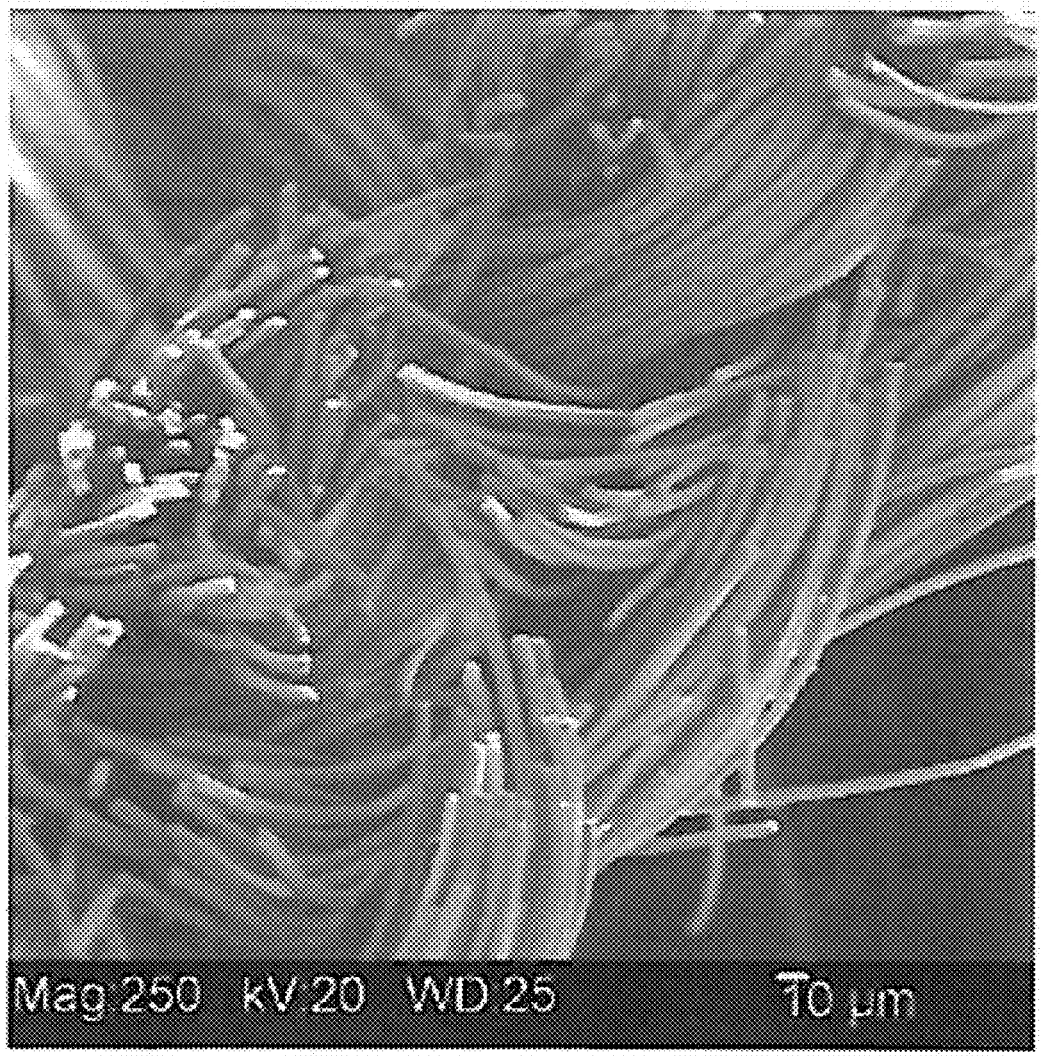

METHOD FOR PRODUCING CERAMIC OR METAL COMPONENTS BY MEANS OF POWDER INJECTION MOULDING, BASED ON THE USE OF INORGANIC FIBRES OR NANOFIBRES

BACKGROUND OF THE INVENTION

1. Field of the Invention

The present invention relates to a method for manufacturing parts, and especially of large bulk, by means of powder injection molding or PIM techniques, using so-called hybrid feedstocks containing short or long inorganic fibres or nanofibres.

More specifically, such inorganic fibres or nanofibres may be made of carbon, metal, or ceramic. They are added during the PIM process and disappear at the end of the process, either by dissociation to form an alloy (in the case of a fibre of a different material than the part) or by dissolution in the material (in the case of a fibre of same material as the part).

The components manufactured by means of a method according to the invention provide remarkable properties at all manufacturing steps. Indeed:
the injected parts have an improved mechanical behavior;
the debound parts have an improved mechanical behavior;
the sintered parts have unequaled functional properties, especially improved mechanical properties, density, and heat conductivity.

2. Desription of Related Art

The use of fibres or nanofibres as additives in plastics engineering (polymer manufacturing industry) is known in many industrial applications such as the automobile, aeronautical, and medical fields. The resulting materials, formed of fibres embedded in a polymer matrix, are called polymer-matrix composites.

Such materials more generally have the following properties, which derive from the addition of fibres:
mechanical strengthening;
shock absorption;
high elastic moduli;
fire retardant.

In this context, and more generally, the added fibre is a glass polyaramid (Kevlar®), carbon, or aramid fibre.

Further, the PIM process is currently used to manufacture small metal or ceramic components. Generally, the parts are rather small (bulk of a few $cm^3$) and have a complex shape, since it is a replication process.

In practice, powder injection molding (PIM) is a method which however has a number of disadvantages, which currently appear to be inseparable from this technology, having the following recurrent defects:
the parts are not dense after sintering (a few residual porosities approximately between 1 and 10%), which induces a degradation of functional properties: low heat conductivity, low mechanical properties, low wear resistance . . . , as described in document "Microstructure and mechanical properties of titanium components fabricated by a new powder injection molding technique" (Eric Nyberg, Megan Miller, Kevin Simmons and K. Scott Weila, Materials Science and Engineering C 25 (2005) 336 - 342).
the parts are very brittle when green, that is, just after injection, and when debound.

The brittleness of PIM parts is a recurrent subject, which has been the object of many recent publications, such as document EP 1972419. These problems however have no real technical solution to date.

In this technical field, the use of fibres or nanofibres in feedstocks to manufacture metal matrix composites (MMC) has been mentioned in the past. The fibre is then only used to strengthen the final product, as is the case in an MMC. Thus, and in all cases, fibres have no interest for intermediate steps, especially at the debinding step, and are only used to provide specific properties, generally mechanical, to the final component which is thus formed of fibres embedded in the matrix.

A very thorough description of the state of the art in relation with the MIM (Metal Injection Molding) technique is provided in the following article: Hezhou Ye, Xing Yang Liu, Hanpring Hong, Journal of Materials processing Technology 200 (2008) 12-24.

There thus is an obvious need for the development of new technical solutions, enabling to avoid the pitfalls mentioned hereabove in relation with the PIM technology, and this, at the different steps of the process, and especially at the debinding.

SUMMARY OF THE INVENTION

The present invention provides a new generation of feedstock, based on the use of fibres or nanofibres as additives in the feedstock.

The use of fibres or nanofibres provides the following technical advantages:
during the manufacturing process: the mechanical behavior of green parts (just after injection) and of debound parts is strongly improved;
on the products which may be manufactured: it is possible to manufacture large components and to exceed a 100-$cm^3$ volume. Further, the manufactured products have remarkable physical properties (heat conductivity, electric, mechanical . . . ).

As a feature of the invention and unlike prior art, the fibres incorporated in the feedstock are not present in this form in the final product. Thus, the fibre is not inserted with a view to forming a composite material.

Conversely, and according to the invention, the fibre is only incorporated in the feedstock to provide an ephemeral function in order to improve the PIM process. Thus, the fibre as such disappears from the final product, by diffusion during the sintering.

However, the material forming the fibre remains and is incorporated to the final part.

More specifically, the present invention relates to a feedstock intended to be implemented in the powder injection molding (PIM) technique, which comprises:
at least one inorganic powder, advantageously metallic or ceramic;
a polymeric binder;
inorganic fibres or nanofibres, advantageously ceramic or metallic.

As known, the feedstock thus comprises at least one inorganic powder and a polymeric binder.

The inorganic powder according to the invention may be a powder made of a single material, of several materials, or a mixture of powders. Advantageously, it is a metal or ceramic powder. It may for example be a powder of alumina, iron (Fe), or nickel (Ni). In the case where the final part is formed of a Fe—Ni alloy, it is possible to use a mixture of Fe and Ni powders, respectively, or a single powder already made of this alloy.

Although the powder is generally micronic, the use of nanometric powder(s) can be envisaged.

It should be noted that the powder may be treated by means of a surfactant, such as, for example, stearic acid. This enables to lower or to eliminate the necessary surfactant rate in the polymer binder.

Conventionally, the feedstock according to the invention also comprises a polymeric binder, intended to be eliminated during the debinding step. Advantageously, it comprises one or several addition polymers behaving as a plasticizer, lubricant, and/or surfactant. It advantageously is a mixture of polymers which are eliminated step by step during the debinding step. It may for example be a mixture of polyethylene glycol (PEG), behaving as a fluidifying agent (injection enhancer), and of polyethylene (PE), behaving as a plasticizer. The latter advantageously amounts to approximately 20% by volume of the PEG, or even less. As will be seen hereafter, this low plasticizer rate is made possible due to the presence of fibres or nanofibres in the feedstock.

In the specific case of a PEG+PE mixture as a polymeric binder, the PEG may be eliminated, first, by means of a chemical debinding carried out in the presence of water, or by debinding by means of a supercritical fluid such as $CO_2$, resulting in the dissolution of the PEG. Then, the PE may be eliminated by thermal debinding at a temperature which does not affect the inorganic fibres present in the feedstock. Such a thermal debinding typically occurs at approximately 400° C., under air in the case of ceramic powders and under a neutral gas in the case of metal powders which could be oxidizable under air at this temperature.

Further, and to be able to be selectively debound with respect to the PE, the PEG preferably has a low molecular weight and a short chain (typically lower than 1,500 g. mol-1). During the debinding with a supercritical fluid, for example, by means of supercritical $CO_2$, the PEG is eliminated while the PE is kept and will be debound during the thermal pre-treatment step.

Typically according to the invention, the feedstock further comprises fibres, advantageously of micronic diameter, or nanofibres of nanometric diameter. These may be short or long fibres with dimensions ranging from 10 microns to 10 millimeters.

It should be noted that the fibres or nanofibres may also be treated by means of a surfactant, such as for example stearic acid. This enables to lower the necessary surfactant rate in the polymeric binder.

As already mentioned, such fibres or nanofibres are inorganic. They are advantageously made of ceramic or metal.

There are several hypothetical cases as to the relative nature of the fibres or nanofibres with respect to the inorganic powder present in the feedstock.

Advantageously, in the case of one or more metal powders, the fibres or nanofibres are metallic and in the case of one or more ceramic powders, the fibres or nanofibres are made of ceramic.

More advantageously still, the fibres or nanofibres are formed by means of a material taking part in the composition of at least the inorganic powder.

According to a first embodiment, the powder and the fibres or nanofibres are formed by means of the same material. This especially concerns a ceramic powder and, in this case, the fibre or nanofibre is preferably made of the same ceramic as the powder.

For example, the ceramic is alumina. In this specific case, the fibres advantageously have a diameter ranging between 1 and 10 microns, and a length ranging from 1 to 10 millimeters.

Thus, in this case, the fibres have the function of strengthening green parts (after injection) and brown parts (after debinding), and above all of providing a significant density for the final part. Similarly, the fibre arrangement created during the extrusion/injection step enables to enhance the anisotropy along one or two preferential directions.

As a variation, the feedstock comprises a mixture of powders and the inorganic fibres or nanofibres are formed by means of the same material as that forming one of the powders of the mixture.

Such is in particular the case for a totally metallic powder (containing no oxide of these metals but which may be made of a mixture of native materials or a metal alloy). The fibre or nanofibre is then preferentially made of the same metal as at least one of the powder components.

As an example, the metal powder may be made of a mixture of powders (Ni+Fe) or of an alloy of metals (Fe—Ni). The fibres are then advantageously formed by means of one of the metals of the mixture or of the alloy, that is, Ni or Fe.

In this case, the relative composition of the final product with respect to the initial powder mixture is modified, since it is enriched with the material forming the fibres or nanofibres.

In this context, in addition to the functions carried out by the polymer fibres (that is, to provide an improved mechanical behavior of green and brown parts), the inorganic fibre thus behaves as a "metallurgical" reservoir. The fibre may be used as a source of chemical elements necessary to form the desired alloy. Thus, and as an example, by the insertion of copper fibres in the formulation of a feedstock to manufacture WCu components, the fibre provides a copper reservoir which may diffuse during the sintering step and thus dope the alloy made of the sole powders.

According to another aspect, the invention relates to a method for manufacturing a feedstock such as defined hereabove, which comprises the steps of:
  preparing the polymeric binder by incorporation and mixture of the polymers forming the binder;
  incorporating the inorganic fibres or nanofibres;
  incorporating the inorganic powder(s).

The last two steps may be inverted, that is, the inorganic powder(s) may be incorporated before the inorganic fibres or nanofibres.

The preparation of the polymeric binder is advantageously performed in a kneader and under heating. The incorporation of the powders and of the fibres is also preferably performed in the kneader to provide a homogeneous mixture thereof.

The powders and the fibres or nanofibres are added by an adapted quantity until the desired charge value (filler content by volume) is reached, which may amount to from 50% to 80% of the total volume of the feedstock, which is a high rate with respect to prior art.

The relative proportion of the powders and of the fibres or nanofibres is especially adjusted according to the composition and to the properties desired for the final product.

According to another aspect, the invention also aims at a method for manufacturing parts by the powder injection molding (PIM) technique, which comprises the steps of:
  preparing a feedstock such as defined hereabove;
  injecting the feedstock into the mould;
  debinding, advantageously, chemically, thermally, and/or by means of a supercritical fluid such as supercritical $CO_2$;
  sintering in conditions enabling to destructure the fibres or nanofibres.

The feedstock is advantageously prepared as described hereabove.

According to a preferred embodiment, the feedstock thus prepared is cooled and granulated, advantageously by means of a granulator. It is then used as a raw material for the injection. The injection into an adapted mould occurs conventionally, advantageously under pressure. Typically, the granules are heated in the injection screw and then injected in a matrix.

Advantageously, and as already mentioned, the fibres or nanofibres are given a direction during the injection step. Thus, the fibre arrangement enables to provide some anisotropy (low, but however possible in the case of a residual porosity) which may be advantageous on the final product (high heat conductivity, for example).

Conventionally, the debinding step is intended to eliminate the polymeric binder. It advantageously is a chemical debinding or a thermal debinding, generally a combination of the two techniques, applied successively. Advantageously, the debinding conditions do not deteriorate the fibres or nanofibres which are present.

As already mentioned, in the specific case of a polymeric binder formed of PEG+PE, the PEG may be eliminated, first, by means of a chemical debinding performed in the presence of water, resulting in the dissolution of the PEG.

As an alternative to chemical debinding, a debinding by supercritical fluid, advantageously supercritical $CO_2$, may be carried out. Then, the PE may be eliminated by a thermal debinding at a temperature which does not affect the inorganic fibres present in the feedstock.

The next step is the sintering, during which step the structure of the fibre or nanofibre disappears. Thus, and advantageously, the sintering is carried out at a temperature on the order of $0.7 \times Tf$ (Tf: melting temperature) of the material to be sintered, in the case in point, the material forming the fibres or nanofibres. The sintering normally lasts for at least 1 hour.

It should be noted that, importantly, the use of very thin fibres or nanofibres is preferred since it enables to limit diffusion distances and thus ascertains that the fibres are totally "consumed". With such a total consumption, the fibre entirely disappears after sintering.

The method according to the invention provides parts with unique properties, and especially:
- a significant size, advantageously with a volume greater than 100 cm$^3$, or even greater than 1 liter;
- an adaptable composition;
- an improved density;
- an improved heat conductivity;
- improved mechanical properties;
- anisotropic properties.

The advantages of the present invention will better appear from the following embodiments.

DESCRIPTION OF THE DRAWINGS

FIG. 1 is a scanning electron microscopy view of alumina fibres surfacted by stearic acid ALK15 (ZIRCAR).

DETAILED DESCRIPTION OF THE INVENTION

The following non-limiting embodiments, in relation with the accompanying drawing, aim at illustrating the invention.

1/EXAMPLE 1

Forming of a Component Made of Pure Alumina by the Forming of a Feedstock of Strong Filler Content 1-1. Forming of a Feedstock Based on Polyethylene Glycol (PEG)+Polyethylene (PE)+Alumina Fibres+Alumina:

The PEG and PE polymer granules are heated and mixed in a kneader. The volume proportion of PE, which is used as a plasticizer, is on the order of 20% of the PEG. This PE quantity is very low since part of its function is carried out by the alumina fibre.

The micronic surfacted alumina powder is progressively incorporated into the kneader to reach a volume filler content of 40% of the total volume of the feedstock.

Then, the alumina fibre, itself surfacted by stearic acid (AS), is incorporated as a complement to the powder, until a total charge rate of 55% is reached (55% of the total volume of the feedstock). The alumina fibres have a diameter ranging from 1 to 10 microns (μm) and a length ranging from 1 to 10 mm. Alumina fibres, adapted to the method according to the invention, for example are ALK15 fibres sold by Zircar, a scanning electron microscope view of which is shown in FIG. 1.

In this formulation, the populations in presence in the feedstock thus are the following (proportion by volume):
PEG: 35%
PE: 7%
AS: 3%
powder alumina: 40%
fibre alumina: 15%

The mixture is then cooled and granulated.

1-2. Injection and Debinding:

The part is conventionally injected according to the conventional PIM technology: the granules are heated in the injection screw and then injected in a matrix. The part is then cooled and ejected.

The debinding is performed in water. The entire PEG is eliminated by dissolution in water (4 h in a thermostatic bath stirred at 80° C.). The residual PE enables to bind the fibres and the powders and to ensure the mechanical behavior of the debound part. In addition to PE, the alumina fibres present also behave as binders of the alumina powders and thus ensure the integrity of the part.

1-3. Sintering:

The sintering operation is preceded by the thermal debinding (approximately 400° C. for 2 hours), which enables to totally remove the PE. Then, the assembly is sintered at 1,700° C. for 1 hour. The fibre structure disappears after sintering.

In this case, the powders and the fibres in presence are formed of the same material, in the case in point, alumina. The fibres thus disappear and a component formed of a single nature of material is obtained.

2/EXAMPLE 2

Forming of an FeNi Alloy of Variable Composition

In this embodiment, the final component may be manufactured in a series of different alloys, while using the same source of iron and nickel powder (Fe—Ni).

As an example, components made of Fe-36% Ni (known as Invar) are formed, starting from Fe-8% Ni powders. Fe-8% Ni powders contain 8% by mass of Ni for 92% of Fe, while the Fe-36% Ni components contain 36% by mass of Ni for 64% of Fe.

In practice, one incorporates in the formulation of the feedstock, micronic FeNi powder, and micronic Ni fibres, by an exact quantity sufficient to enable to respect the desired FeNi composition for the final components.

A formulation comprises by mass:
PEG: 70%;
PE: 6%;
Fe8% Ni powder: 16%;
Ni fibres: 7%;

AS: 1%.

The implementation of the method according to the invention, such as described in example 1, enables to form Fe—Ni36% components after sintering, with a sintering temperature conventionally of 1,250° C.

In this case, the (Fe—Ni) fibres and the (Ni) fibres in presence are not made of the same material. The fibres are thus dissociated and an alloy is obtained, in the case in point, the alloy forming the powders is modified with a nickel enrichment.

The invention claimed is:

1. A feedstock for powder injection molding, comprising:
   a metal or ceramic powder;
   a polymeric binder formed of polyethylene glycol (PEG) and polyethylene (PE);
   metallic or ceramic fibres or nanofibres, the fibres or nanofibres being metallic when the powder is metallic, and the fibres or nanofibres being ceramic when the powder is ceramic.

2. The feedstock of claim 1, wherein the fibres or nanofibres are formed by means of a material taking part in the composition of the powder.

3. The feedstock of claim 2, wherein the powder and the fibres or nanofibres are formed by means of the same material.

4. The feedstock of claim 2, wherein the feedstock comprises a mixture of powders and wherein the fibres or nanofibres are formed by means of the same material as that forming one of the powders of the mixture.

5. The feedstock of claim 2, wherein the powder is formed of a mixture of materials and wherein the fibres or nanofibres are formed by means of one of the materials forming the powder.

6. A method for manufacturing a feedstock that includes a metal or ceramic powder, a polymeric binder formed of polyethylene glycol (PEG) and polyethylene (PE), and metallic or ceramic fibres or nanofibres, the fibres or nanofibres being metallic when the powder is metallic, and the fibres or nanofibres being ceramic when the powder is ceramic, said method, comprising the steps of:
   preparing the polymeric binder by incorporation and mixture of at least one polymer forming the binder;
   incorporating the inorganic fibres or nanofibres; and
   incorporating the metal or ceramic powder.

7. A method for manufacturing a feedstock that includes a metal or ceramic powder, a polymeric binder formed of polyethylene glycol (PEG) and polyethylene (PE), and metallic or ceramic fibres or nanofibres, the fibres or nanofibres being metallic when the powder is metallic, and the fibres or nanofibres being ceramic when the powder is ceramic, said method, comprising the steps of:
   preparing the polymeric binder by incorporation and mixture of at least one polymer forming the binder;
   incorporating the metal or ceramic powder; and
   incorporating the inorganic fibres or nanofibres.

8. The feedstock manufacturing method of claim 6, wherein the volume filler content of powders and fibres or nanofibres ranges between 50% and 80%.

9. A method for manufacturing parts by a powder injection molding technique, comprising the steps of:
   preparing a feedstock that includes a metal or ceramic powder, a polymeric binder, and metallic or ceramic fibres or nanofibres, the fibres or nanofibres being metallic when the powder is metallic, and the fibres or nanofibres being ceramic when the powder is ceramic;
   injecting the feedstock into a mold;
   debinding; and
   sintering in conditions enabling the destruction of the fibres or nanofibres.

10. The method for manufacturing parts of claim 9, wherein the sintering is performed at a temperature on the order of 0.7 times the melting temperature of the material forming the fibres or nanofibres.

11. The method for manufacturing parts of claim 9, wherein the fibres or nanofibres are given a direction during the injection step.

12. A part obtained by means of the manufacturing method of claim 9.

13. The part of claim 12, wherein it is a part of large bulk, advantageously having a volume greater than 100 cm$^3$, or even greater than 1 liter.

14. The feedstock of claim 3, wherein the material is a ceramic.

15. The feedstock of claim 3, wherein the material is alumina.

16. The feedstock of claim 4, wherein the powders are metallic.

17. The feedstock of claim 5, wherein the materials are metallic alloys.

18. The method of claim 6, wherein the polymeric binder is prepared in a kneader and under heating.

19. The method of claim 7, wherein the polymeric binder is prepared in a kneader and under heating.

20. The method of claim 9, wherein the debinding is performed chemically, thermally, and/or by means of a supercritical fluid such as supercritical $CO_2$.

* * * * *